US012600309B2

(12) United States Patent
Sasahara

(10) Patent No.: US 12,600,309 B2
(45) Date of Patent: Apr. 14, 2026

(54) POWER SOURCE CONTROL SYSTEM

(71) Applicant: Yazaki Corporation, Tokyo (JP)

(72) Inventor: Masato Sasahara, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/897,349

(22) Filed: Sep. 26, 2024

(65) Prior Publication Data

US 2025/0018888 A1 Jan. 16, 2025

Related U.S. Application Data

(63) Continuation of application No. PCT/JP2023/042016, filed on Nov. 22, 2023.

(30) Foreign Application Priority Data

Dec. 21, 2022 (JP) ................................. 2022-204550

(51) Int. Cl.
*B60R 16/033* (2006.01)
*H02J 1/08* (2026.01)
*H02J 1/10* (2026.01)
*H01H 85/04* (2006.01)

(52) U.S. Cl.
CPC ............ *B60R 16/033* (2013.01); *H02J 1/084* (2020.01); *H02J 1/10* (2013.01); *H01H 85/04* (2013.01)

(58) Field of Classification Search
CPC ........ B60R 16/033; B60R 16/03; H02J 1/084; H02J 1/10; H02J 1/00; H01H 85/04; B60L 1/00; B60L 3/00; B60L 58/20
See application file for complete search history.

(56) References Cited

U.S. PATENT DOCUMENTS

| | | | |
|---|---|---|---|
| 2021/0066956 A1 | 3/2021 | Izawa et al. | |
| 2022/0302726 A1* | 9/2022 | Matsumoto | ........... H02J 7/0068 |
| 2024/0302441 A1* | 9/2024 | Morita | ...................... H02J 7/00 |

FOREIGN PATENT DOCUMENTS

JP 2021-035208 A 3/2021

* cited by examiner

*Primary Examiner* — Lincoln D Donovan
*Assistant Examiner* — Alex W Lam
(74) *Attorney, Agent, or Firm* — Sughrue Mion, PLLC

(57) ABSTRACT

A power source control system includes a first power source, a second power source, a first switch, a second switch, a first voltage detector, a second voltage detector, and a control unit. The first power source supplies power to a first load and a second load. The second power source supplies power to the second load when an abnormality occurs. The control unit detects the presence or absence of an abnormality based on a voltage detected by the first voltage detector and/or the second voltage detector. In addition, the control unit switches on the first switch and switches off the second switch in a normal state. Further, the control unit switches off the first switch and switches on the second switch when an abnormality is detected.

5 Claims, 11 Drawing Sheets

POWER SOURCE CONTROL SYSTEM

CROSS-REFERENCE TO RELATED APPLICATIONS

The present application is a continuation of International Application No. PCT/JP2023/042016, filed on Nov. 22, 2023, and based upon and claims the benefit of priority from Japanese Patent Application No. 2022-204550, filed on Dec. 21, 2022, the entire contents of which are incorporated herein by reference.

TECHNICAL FIELD

The present disclosure relates to a power source control system.

BACKGROUND

Conventionally, a technology for switching power to be supplied to a plurality of loads has been proposed in a power source system for a vehicle. JP2021-35208A discloses a power source system for a vehicle including a main power source device and a backup battery. In the power source system for a vehicle disclosed in JP2021-35208A, when an abnormality occurs in the main power source device, power is supplied from the backup battery to a load necessary for allowing the vehicle to travel, thereby making it possible to allow the vehicle to travel to a place where safety is ensured.

SUMMARY OF THE INVENTION

In recent years, the functions and performance of vehicles such as automatic traveling vehicles have improved, and the number of loads mounted on the vehicle has also increased. In the power source system for a vehicle disclosed in Patent Literature 1, when an abnormality occurs in any of the loads necessary for allowing the vehicle to travel, a switch in a path for supplying power is switched off, thereby making it difficult for the vehicle to travel continuously. That is, a power source control system is required with which it is possible to allow the vehicle to travel continuously even when an abnormality occurs in some of a plurality of loads mounted on the vehicle.

An object of the present disclosure is to provide a power source control system that is capable of continuously supplying power to a load in which an abnormality has not occurred when an abnormality occurs in some loads among a plurality of loads mounted on a vehicle.

A power source control system according to an embodiment includes: a first power source that supplies power to a first load and a plurality of second loads provided in a vehicle via a first conductive path connected to the first load and a second conductive path connected to the plurality of second loads; a second power source that supplies power to the second load via the second conductive path when an abnormality occurs in the first load or the second load; a first fuse that is provided in the first conductive path and fused when an abnormality occurs in the first load; a plurality of second fuses, which are provided in the second conductive path, corresponding to each of the plurality of second loads and fused when an abnormality occurs in the second load; a first voltage detector that is connected to the first conductive path and detects voltages of the first load and the plurality of second loads; a second voltage detector that is connected to the second conductive path and detects voltages of the plurality of second loads; a first switch having one end connected to the first power source and the other end connected to the second conductive path; a second switch having one end connected to the second power source and the other end connected to the second conductive path; and a control unit, in which the control unit includes: an abnormality detector that detects the presence or absence of an abnormality in the first load or the second load based on a voltage detected by the first voltage detector and/or the second voltage detector; and a switch control unit that switches on the first switch and switches off the second switch in a normal state, and switches off the first switch and switches on the second switch when the abnormality detector detects an abnormality in the first load or the second load.

A power source control system according to another aspect of the embodiment includes: a first power source that supplies power to a first load and a plurality of second loads provided in a vehicle via a first conductive path connected to the first load and a second conductive path connected to the plurality of second loads; a second power source that supplies power to the second load via the second conductive path when an abnormality occurs in the first load or the second load; a first fuse that is provided in the first conductive path and fused when an abnormality occurs in the first load; a plurality of second fuses, which are provided in the second conductive path, corresponding to each of the plurality of second loads and fused when an abnormality occurs in the second load; a voltage detector that is connected to the first conductive path and detects voltages of the first load and the plurality of second loads; a first switch having one end connected to the first power source and the other end connected to the second conductive path; a second switch having one end connected to the second power source and the other end connected to the second conductive path; a current detector connected in series with the second switch; and a control unit, in which the control unit includes: an abnormality detector that detects the presence or absence of an abnormality in the first load or the second load based on a voltage detected by the voltage detector and/or a current detected by the current detector; and a switch control unit that switches on the first switch and switches off the second switch in a normal state, and switches off the first switch and switches on the second switch when the abnormality detector detects an abnormality in the first load or the second load.

The above configuration makes it possible to provide a power source control system that is capable of continuously supplying power to a load in which an abnormality has not occurred when an abnormality occurs in some loads among a plurality of loads mounted on a vehicle.

DETAILED DESCRIPTION OF THE INVENTION

Hereinafter, a power source control system 1 according to a present embodiment will be described in detail with reference to the drawings. Note that the dimensional ratio of the drawings is exaggerated for the sake of explanation, and may differ from the actual ratio.

(Configuration of Power Source Control System 1)

Figure 1:
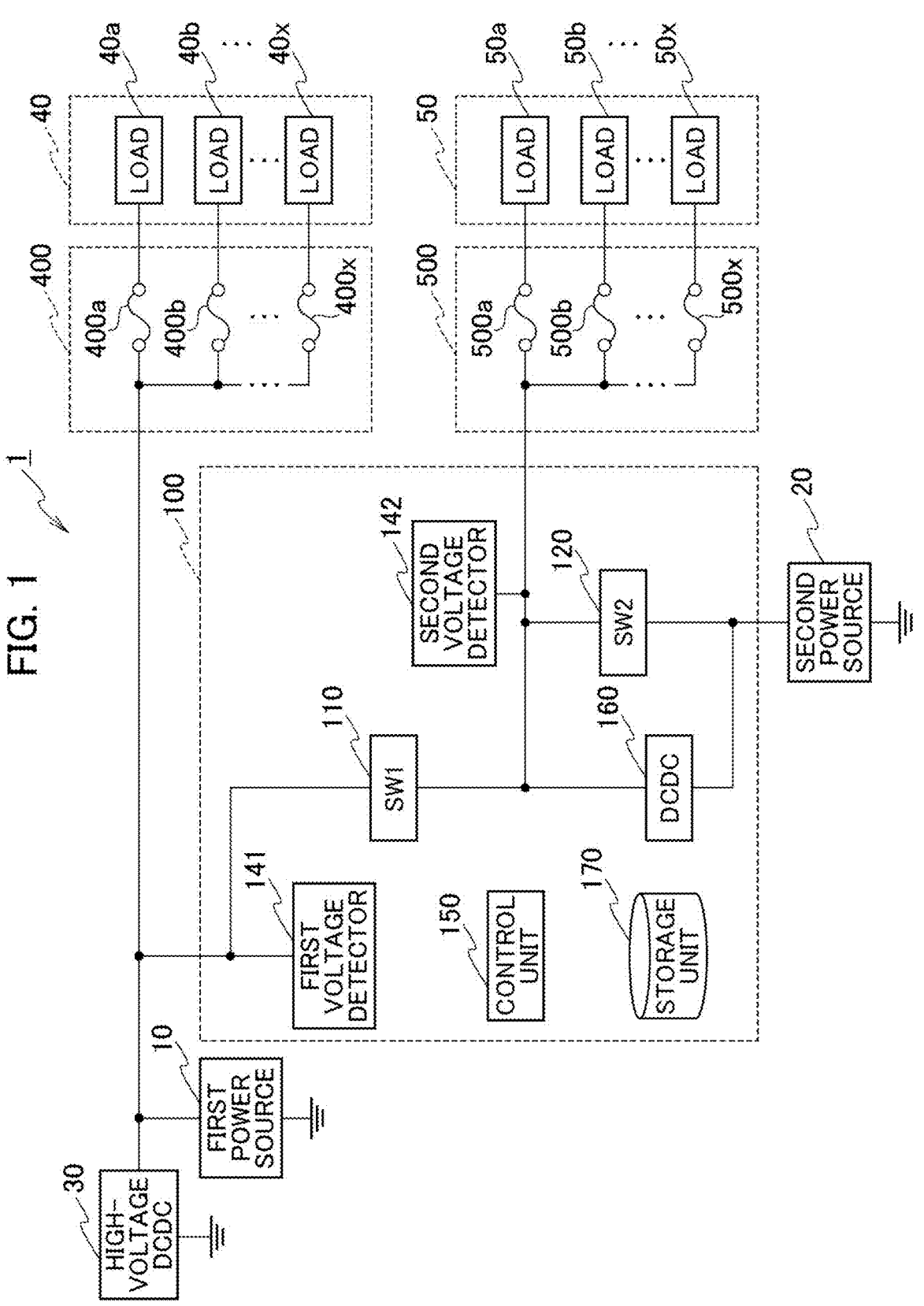
FIG. 1 is a block diagram illustrating a configuration of a power source control system according to a present embodiment.

FIG. 1 is a block diagram illustrating a configuration of a power source control system 1 according to a present embodiment. As illustrated in FIG. 1, the power source control system 1 includes a first power source 10, a second power source 20, a power source control device 100, a first load 40, a second load 50, a first fuse 400, and a second fuse 500. The power source control system 1 may also include a high-voltage DCDC converter 30. The power source control system 1 supplies power to the first load 40 mounted on a vehicle from the first power source 10 via a first conductive path L1 connected to the first load 40. The power source control system 1 also supplies power to a plurality of second loads 50 mounted on the vehicle from the first power source 10 or the second power source 20 via a second conductive path L2 connected to the second load 50. The present specification describes a configuration in which the vehicle on which the power source control system 1 according to the present embodiment is mounted is an autonomous driving vehicle (autonomous vehicle). Note that the present disclosure is not limited to the above configuration, and for example, the power source control system 1 may be applied to a general vehicle.

In the present embodiment, the power source control system 1 supplies power to the first load 40 and the second load 50 from the first power source 10 in a normal state. Further, in the present embodiment, when an abnormality occurs in the first load 40 or the second load 50, the power source control system 1 supplies power to the second load 50 from the second power source 20 via the second conductive path L2. Incidentally, in the present embodiment, "an abnormality occurs" refers to a case in which a ground fault or the like occurs in the first load 40 or the second load 50, and a voltage drop from the first power source 10 occurs or an excessive current occurs in a path from the first power source 10 to the first load 40 or the second load 50. In the present embodiment, the normal state includes a state in which the power source control system 1 returns from a state in which an abnormality has occurred (abnormal state) in addition to a state in which no abnormality described above has occurred. The details of a return from an abnormal state will be described later.

As described above, the first power source 10 supplies power to the first load 40 or the plurality of second loads 50 provided in the vehicle via the first conductive path L1 connected to the first load 40 and the second conductive path L2 connected to the plurality of second loads 50. In addition, the first power source 10 stores power and is realized, for example, by a lead-acid battery. The first power source 10 is connected to the high-voltage DCDC converter 30 described below and stores a DC power stepped down by the high-voltage DCDC converter 30. The first power source 10 is connected to the first load 40 via the first conductive path L1. The first power source 10 is connected to the second load 50 via the second conductive path L2. Further, the first power source 10 is connected to the second power source 20 via a first switch 110 and a DCDC converter 160 described below. The first power source 10 supplies power to the first load 40 and also supplies power to the second load 50.

The high-voltage DCDC converter 30 is connected, for example, to a power supply unit (not illustrated) that supplies power from the outside, and steps down a voltage of the DC power output from the power supply unit. In the present embodiment, the high-voltage DCDC converter 30 steps down a voltage to 12 V, for example. The high-voltage DCDC converter 30 is connected to the first power source 10, and outputs the step-down DC power to the first power source 10. In addition, the high-voltage DCDC converter 30 is connected to the first load 40 via the first conductive path L1. Further, the high-voltage DCDC converter 30 is connected to the second load 50 via the second conductive path L2. The high-voltage DCDC converter 30 supplies power to the first load 40, and also supplies power to the second load 50.

The second power source 20 supplies power to the second load 50 instead of the first power source 10 when an abnormality such as a ground fault occurs in the first load 40 or the second load 50. In the present embodiment, the second power source 20 is constituted of, for example, a lithium ion battery (LIB). In addition, the second power source 20 is connected to a DCDC converter 160, and stores DC power subjected to voltage adjustment such as boosting by the DCDC converter 160. For example, in the present embodiment, a voltage of the power supplied to the second power source 20 is 12 V. The second power source 20 is connected to the second load 50 via a second switch 120 and the second conductive path L2, and supplies the stored DC power to the second load 50.

The first load 40 may include a plurality of first loads 40a, 40b, . . . , and 40x as illustrated in FIG. 1. For example, the first load 40 corresponds to general equipment such as an air conditioner and audio equipment, and important equipment such as an electric power steering (EPS), brake equipment, and a sensor. Hereinafter, when it is not necessary to separately describe each of the first loads, it will be simply referred to as "first load 40".

The first fuse 400 includes a plurality of first fuses 400a, 400b, . . . , and 400x, which are provided in the first conductive path L1, corresponding to the first load 40. In addition, the respective first fuses 400a, 400b, . . . , and 400x are fused when an abnormality occurs in the corresponding first loads 40a, 40b, . . . , and 40x. Specifically, the first fuses 400a, 400b, . . . , and 400x are fused by heat increasing due to an excessive current or the like generated when an abnormality occurs in the corresponding first loads 40a, 40b, . . . , and 40x.

The first fuses 400*a*, 400*b*, . . . , and 400*x* are fused after a predetermined time has elapsed following the occurrence of an abnormality in the corresponding first loads 40*a*, 40*b*, . . . , and 40*x*. The time until the first fuses 400*a*, 400*b*, . . . , and 400*x* are fused varies depending on the occurrence state of the abnormality or the capacity of the fuse, and in the present embodiment, it is assumed to be about 100 ms as an example. The time until the first fuses 400*a*, 400*b*, . . . , and 400*x* are fused is not limited to the configuration of the present embodiment, and may be shorter than 100 ms or longer than 100 ms. Hereinafter, when it is not necessary to describe each of the first fuses separately, it will be simply referred to as "first fuse 400".

The second load 50 may include a plurality of second loads 50*a*, 50*b*, . . . , and 50*x* as illustrated in FIG. 1. In the present embodiment, the second load 50 includes minimum loads necessary to enable automatic driving continuously. The second load 50 corresponds to important equipment such as electric power steering (EPS), brake equipment, and a sensor. Hereinafter, when it is not necessary to separately describe each of the second loads, it will be simply referred to as "second load 50".

The second fuse 500 includes a plurality of second fuses 500*a*, 500*b*, . . . , and 500*x*, which are provided in the second conductive path L2, corresponding to the second load 50. In addition, the respective second fuses 500*a*, 500*b*, . . . , and 500*x* are fused when an abnormality occurs in the corresponding second loads 50*a*, 50*b*, . . . , and 50*x*. Specifically, the second fuses 500*a*, 500*b*, . . . , and 500*x* are fused by heat increasing due to an excessive current or the like generated when an abnormality occurs in the corresponding second loads 50*a*, 50*b*, . . . , and 50*x*.

Similar to the first fuse 400 described above, the second fuses 500*a*, 500*b*, . . . , and 500*x* are fused after a predetermined time has elapsed following the occurrence of an abnormality in the corresponding second loads 50*a*, 50*b*, . . . , and 50*x*. The time until the second fuses 500*a*, 500*b*, . . . , and 500*x* are fused varies depending on the occurrence state of the abnormality and the capacity of the fuse, and in the present embodiment, as an example, it is assumed to be 100 ms as in the case of the first fuse 400. The time until the second fuses 500*a*, 500*b*, . . . , and 500*x* are fused is not limited to the configuration of the present embodiment, and may be shorter than 100 ms or longer than 100 ms. Hereinafter, when it is not necessary to separately describe each of the second fuses, it will be simply referred to as "second fuse 500".

(Configuration of Power Source Control Device 100)

Next, a configuration of the power source control device 100 will be described. As illustrated in FIG. 1, the power source control device 100 includes a first switch 110, a second switch 120, a first voltage detector 141, a second voltage detector 142, a control unit 150, and a storage unit 170. The power source control device 100 may also include a DCDC converter 160. In FIG. 1, the first switch 110 is denoted by "SW1". Similarly, in FIG. 1, the second switch 120 is denoted by "SW2". Hereinafter, the first switch 110 and the second switch 120 are denoted by "SW1" and "SW2" in the figures, respectively.

The first switch 110 has one end connected to the first power source 10 and the other end connected to the second conductive path L2. Further, the second switch 120 has one end connected to the second power source 20 and the other end connected to the second conductive path L2. In the present embodiment, when the first switch 110 is ON, power is supplied from the first power source 10 to the second load 50 via the second conductive path L2, and when the first switch 110 is OFF, power is not supplied from the first power source 10 to the second load 50. Further, in the present embodiment, when the second switch 120 is ON, power is supplied from the second power source 20 to the second load 50 via the second conductive path L2, and when the second switch 120 is OFF, power is not supplied from the second power source 20 to the second load 50.

Figure 2:
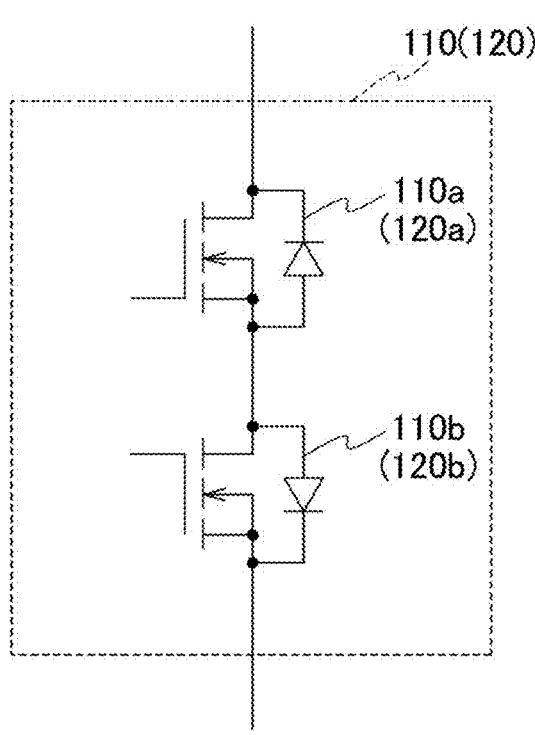
FIG. 2 is a diagram illustrating a configuration of a switch according to the present embodiment.

FIG. 2 is a diagram illustrating the configuration of the first switch 110 and the second switch 120 according to the present embodiment. The first switch 110 and the second switch 120 are constituted by two semiconductor switch elements, and specifically, have a first element 110*a* (120*a*) and a second element 110*b* (120*b*). Both the first element 110*a* (120*a*) and the second element 110*b* (120*b*) are constituted as N-channel MOSFETs and are arranged in opposite directions to each other. In addition, the first switch 110 and the second switch 120 are controlled to be ON and OFF by the control unit 150 described later. The first voltage detector 141 is connected to the first conductive path L1, and detects the voltages of the first load 40 and the second load 50.

The second voltage detector 142 is connected to the second conductive path L2, and detects the voltage of the second load 50. That is, the second voltage detector 142 is connected to the second conductive path L2, and detects the voltages of the plurality of second loads 50*a*, 50*b*, . . . , and 50*b*.

For example, the control unit 150 is configured of an ordinary microcomputer, and realizes a plurality of information processing functions provided in the power source control device 100 by software. That is, the power source control device 100 executes each function provided in the control unit 150 (see FIG. 3) by executing a computer program in the control unit 150. In addition, as another configuration, the control unit 150 may prepare dedicated hardware for executing each information processing illustrated in FIG. 3, and configure the information processing functions by a system large scale integration (LSI) or the like. Further, the system may be configured with a plurality of information processing functions using separate hardware.

Figure 3:
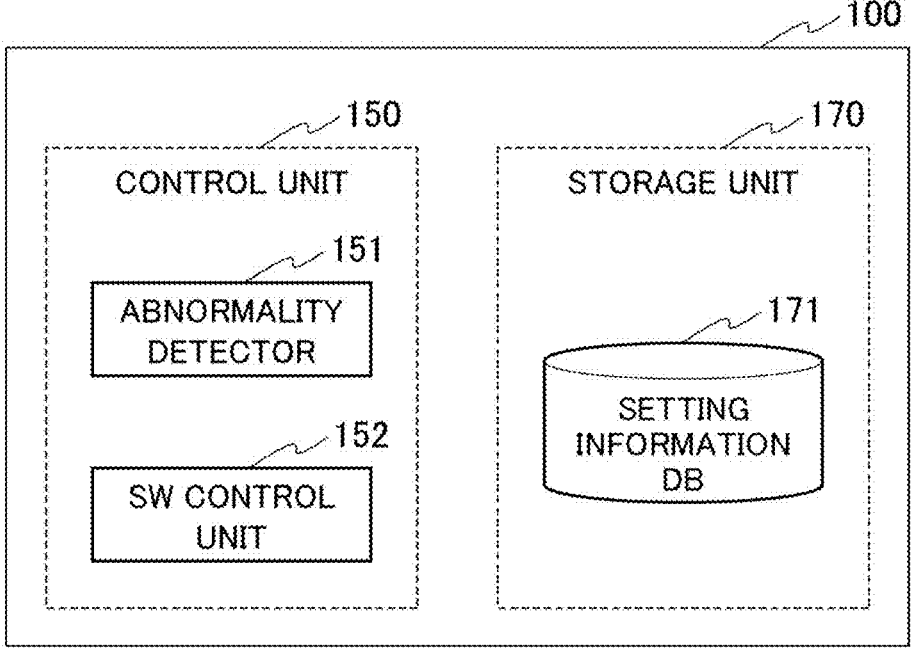
FIG. 3 is a diagram illustrating a functional configuration of a power source control device according to the present embodiment.

As illustrated in FIG. 3, the control unit 150 has an abnormality detector 151 and a switch control unit 152 (SW control unit) as functions.

The abnormality detector 151 detects the presence or absence of an abnormality in the first load 40 or the second load 50 based on a voltage detected by the first voltage detector 141 and/or the second voltage detector 142. In addition, the abnormality detector 151 detects an abnormality by determining that the abnormality has occurred in the first load 40 or the second load 50 when a voltage detected by the first voltage detector 141 drops below a predetermined voltage. Thus, the power source control system 1 can detect an abnormality such as a ground fault that has occurred in the first load 40 or the second load 50 without providing an abnormality detection device for each of the first load 40 and the second load 50. That is, the power source control system 1 does not need to provide an abnormality detection device for each of the loads which increases with the improvement of the function and performance of the vehicle, thereby making it possible to reduce the device in weight and power consumption.

For example, when a ground fault occurs in the first load 40 or the second load 50, a voltage detected by the first voltage detector 141 drops by about 10% from a voltage in the normal state. For example, by setting a predetermined voltage to be about 5% lower than a voltage in the normal state, the abnormality detector 151 can detect an abnormality in the first load 40 or the second load 50 when the voltage drops below the predetermined voltage. Specifically, when the voltage of the power supplied from the first power source 10 and the second power source 20 is 12 V, the predetermined voltage enters 11.4 V, for example. Similarly, the voltage that drops by about 10% from the voltage in a normal case enters 10.8 V. When the voltage of the power supplied from the first power source 10 and the second power source 20 is 12 V and the voltage detected by the first voltage detector 141 drops below 11.4 V, the abnormality detector 151 determines that an abnormality has occurred in the first load 40 or the second load 50.

In addition, regarding the first load 40 or the second load 50 in which an abnormality has occurred, the corresponding first fuse 400 or second fuse 500 is fused due to an increased heat after a predetermined time has elapsed from the occurrence of an abnormality such as a ground fault. The predetermined time varies depending on the performance of the fuse used in the first fuse 400 or the second fuse 500, and may be 100 ms, for example. After the predetermined time has elapsed, the first fuse 400 or the second fuse 500 corresponding to the first load 40 or the second load 50 in which the abnormality has occurred is fused, and thus the voltage which has dropped due to the occurrence of the abnormality returns to a value of the voltage in the normal state, or a value close to the voltage in the normal state. The abnormality detector 151 detects that the abnormality in the system caused by the first load 40 or the second load 50 is eliminated when a voltage detected by the first voltage detector 141 or the second voltage detector 142 increases above a predetermined voltage. The predetermined voltage may be about 5% lower than the voltage in the normal state, for example.

The switch control unit 152 switches on the first switch 110 and switches off the second switch 120 in the normal state. In addition, when the abnormality detector 151 detects an abnormality in the first load 40 or the second load 50, the switch control unit 152 switches off the first switch 110 and switches on the second switch 120. Further, when the abnormality detector 151 detects that an abnormal state that has occurred in the first load 40 or the second load 50 has been eliminated, the switch control unit 152 switches on the first switch 110 and switches off the second switch 120.

As illustrated in FIG. 3, the storage unit 170 stores the information included in the setting information DB 171 (DB: database) as data. The setting information DB 171 may store, for example, a voltage value that serves as a threshold value when the abnormality detector 151 determines an abnormality. In addition, the setting information DB 171 may store setting information necessary for performing the functions of the abnormality detector 151 and the switch control unit 152.

In the present embodiment, the time until the abnormality detector 151 of the control unit 150 detects an abnormality, and the switch control unit 152 switches off the first switch 110 and switches on the second switch 120 is based on the time set by a timer IC or the like included in the control unit 150. For example, in the present embodiment, the time until the abnormality detector 151 of the control unit 150 detects an abnormality, and the switch control unit 152 switches off the first switch 110 and switches on the second switch 120 is assumed to be 1 ms. This time of 1 ms is shorter than 100 ms, which is the time until the first fuse 400 or the second fuse 500 is fused after an abnormality such as a ground fault occurs in the first load 40 or the second load 50.

Thus, an abnormality such as a ground fault occurs in the first load 40 or the second load 50, and by switching a path for power supply before the first fuse 400 or the second fuse 500 is fused, the power can be supplied from the first power source 10 which is the main power source or the second power source 20 to either the first load 40 or the second load 50 in which the abnormality has not occurred, thereby enabling automatic driving continuously and the vehicle to travel to a place where safety is ensured. Further, when the first fuse 400 or the second fuse 500 corresponding to the first load 40 or the second load 50 in which the abnormality has occurred is fused, the abnormality is eliminated, and the abnormality detector 151 of the control unit 150 determines that the abnormality has been eliminated, and the switch control unit 152 then switches off the second switch 120 and switches on the first switch 110, thereby enabling the vehicle to travel continuously using the first load 40 and/or the second load 50. That is, even if an abnormality occurs partially in the second load 50 necessary for automatic driving of the vehicle, the power source control system 1 according to the present embodiment makes it possible to enable the vehicle to travel continuously using the second load 50 and/or the first load 40 in which the abnormality has not occurred.

Figure 4A:
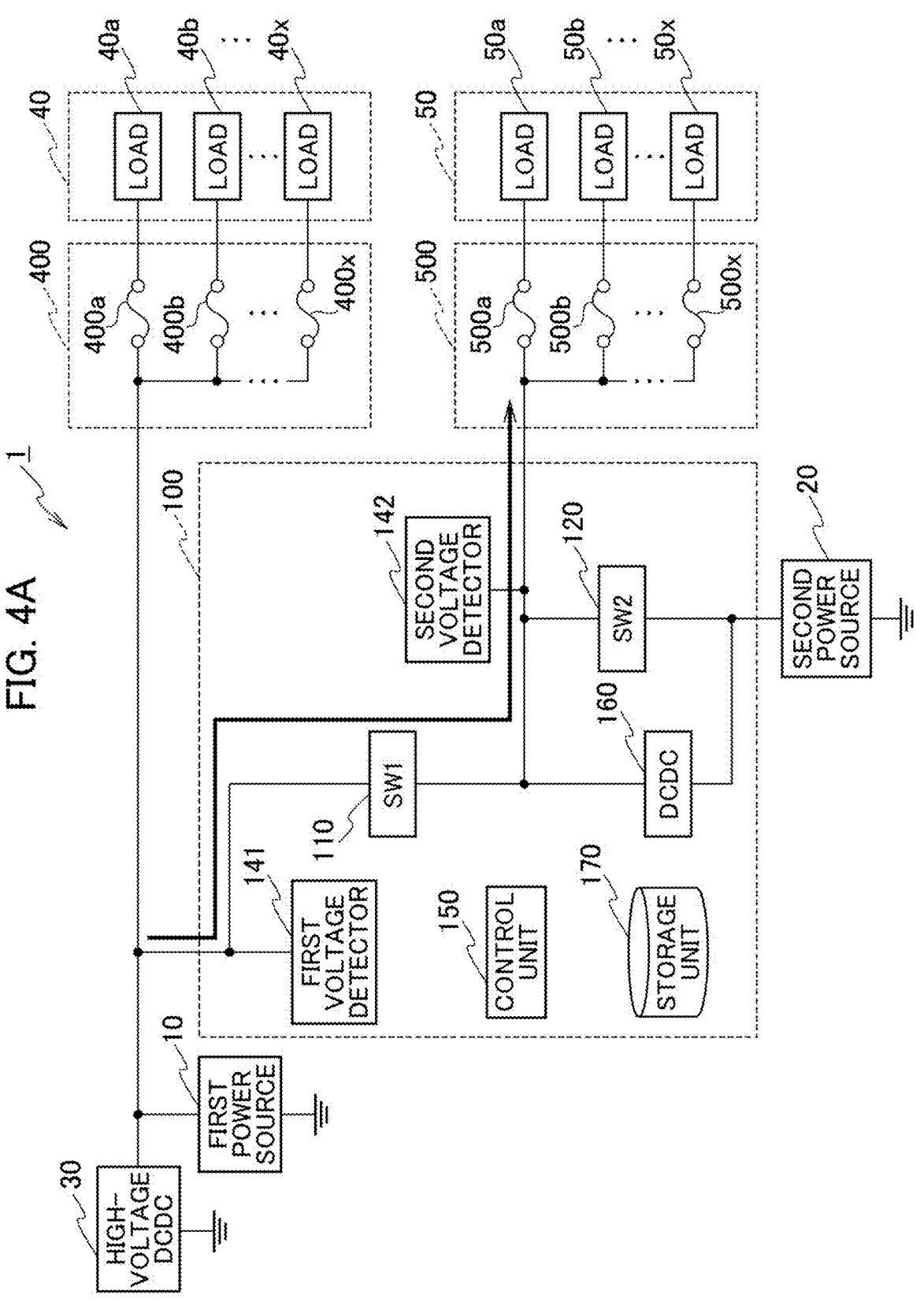
FIG. 4A is a diagram for explaining an example of operation of the power source control system according to the present embodiment.
Figure 4B:
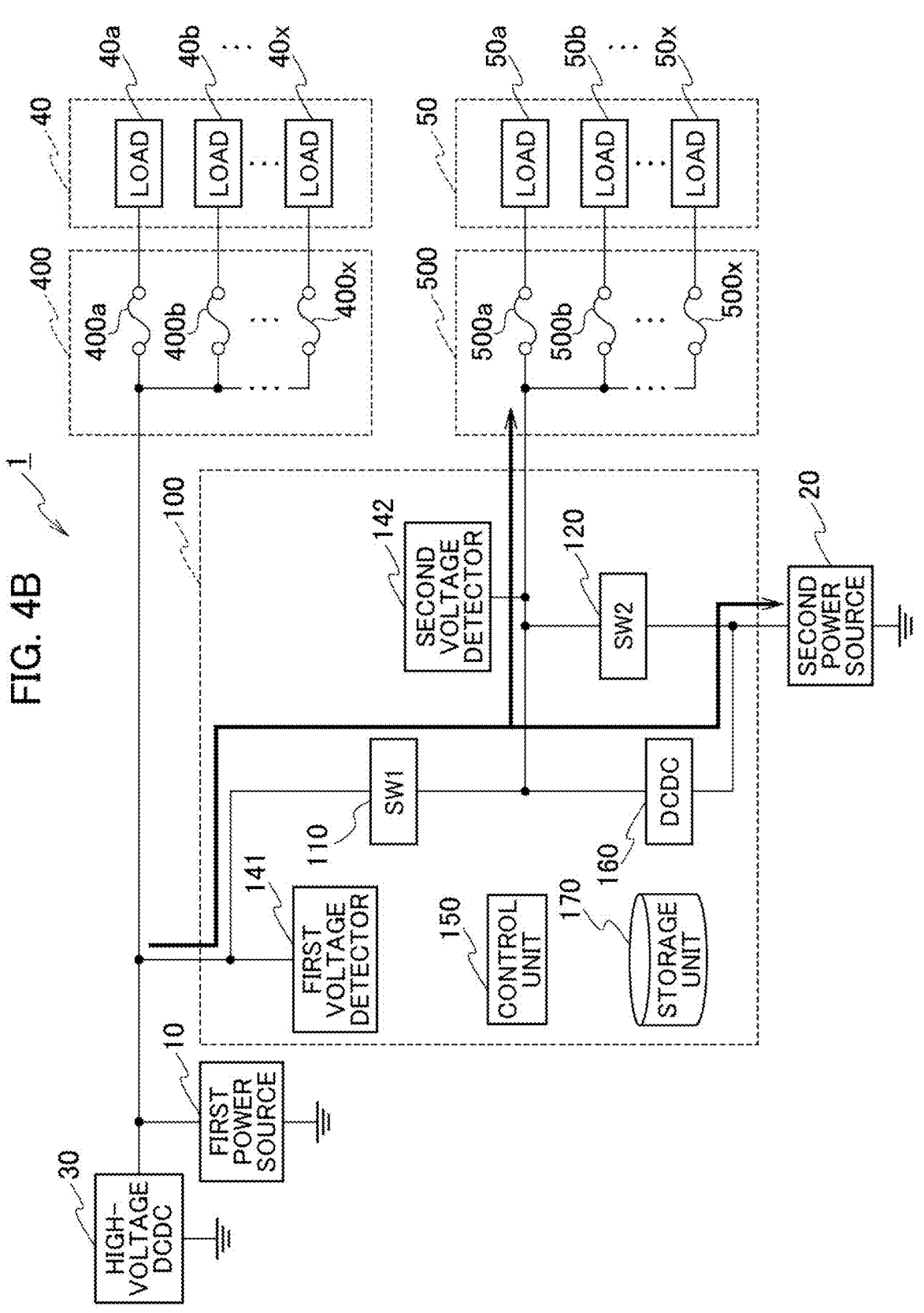
FIG. 4B is a diagram for explaining an example of the operation of the power source control system according to the present embodiment.
Figure 4C:
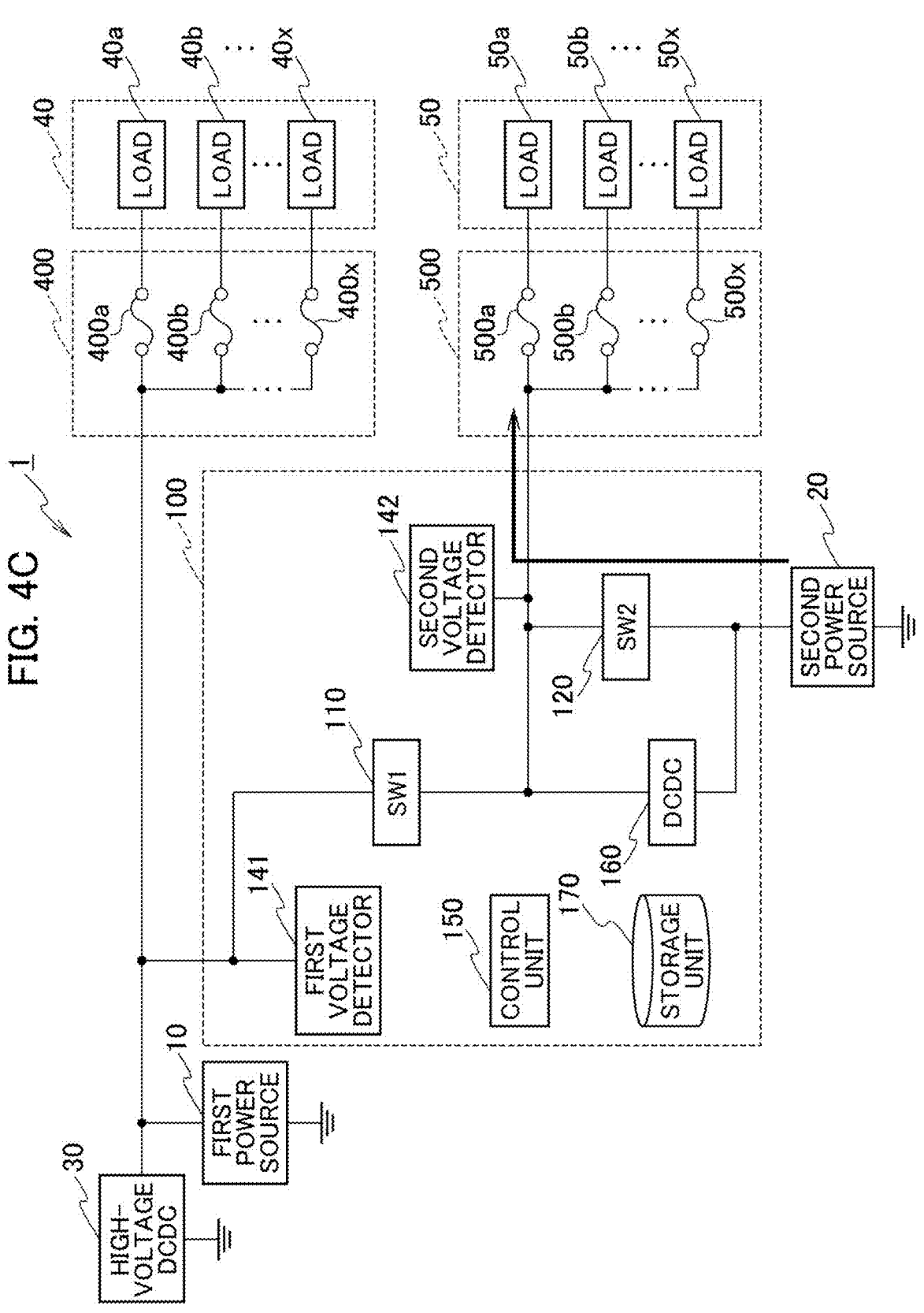
FIG. 4C is a diagram for explaining an example of the operation of the power source control system according to the present embodiment.

FIGS. 4A to 4C are diagrams for explaining an example of the operation of the power source control device 100 according to the present embodiment. In the normal state in which no abnormality occurs in the first load 40 and the second load 50, the first switch 110 is ON and the second switch 120 is OFF. That is, as illustrated in FIG. 4A, the power from the first power source 10 is supplied to the second load 50 via the first switch 110 and the second conductive path L2. In the example illustrated in FIG. 4A, the power from the first power source 10 is also supplied to the first load 40 via the first conductive path L1.

Further, in the example illustrated in FIG. 4B, in the normal state in which the charge amount of the second power source 20 decreases, the power from the first power source 10 is supplied to the second power source 20 via the first switch 110 and the DCDC converter 160. In addition, in the example illustrated in FIG. 4B, the second power source 20 is charged by the supplied power.

In the example illustrated in FIG. 4C, a description will be given regarding an example in which an abnormality occurs in the first load 40 or the second load 50, and the first switch 110 is switched off and the second switch 120 is switched on. As illustrated in FIG. 4C, the power from the second power source 20 is supplied to the second load 50 via the second switch 120 and the second conductive path L2. In addition, in the example illustrated in FIG. 4C, since the first switch 110 is OFF, the power from the first power source 10 is not supplied to the second load 50. Further, in the example illustrated in FIG. 4C, the power from the first power source 10 is supplied to the first load 40. Thereafter, the first fuse 400 or the second fuse 500 corresponding to the first load 40 or the second load 50 in which the abnormality has occurred is fused, thereby eliminating the abnormal state, and reproducing the path of power supply from the first power source 10 to the second load 50 as illustrated in FIG. 4A or 4B.

(Outline of Processing Flow of Power Source Control Device 100)

Figure 5:
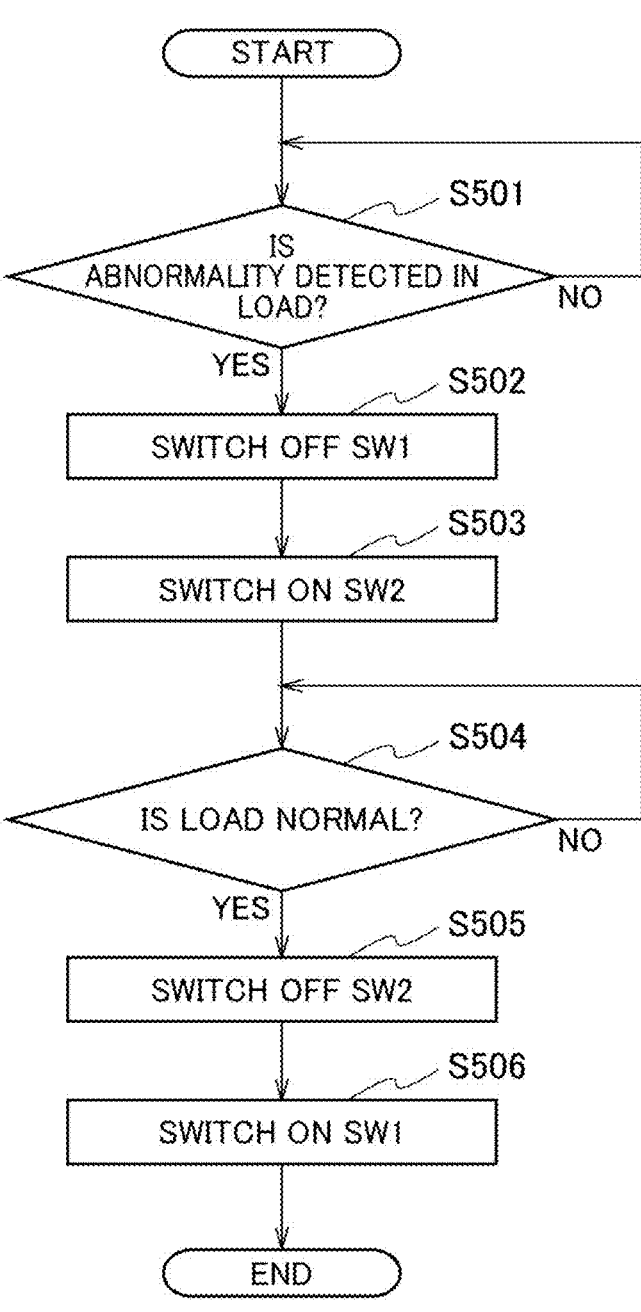
FIG. 5 is a flowchart illustrating an example of the processing of the power source control device according to the present embodiment.

Next, a flow of processing in the power source control device 100 will be described with reference to a flowchart illustrated in FIG. 5. The series of operations of the power source control device 100 illustrated in the flowchart of FIG. 5 are started when the power source control device 100 is activated, and the processing ends when the operations are completed. In the flowchart illustrated in FIG. 5, the processing also ends when the power source is OFF or the processing end is interrupted. In the following description of the flowchart, the same contents as those described in the description of the power source control system 1 described above will be omitted or simplified.

In step S501, the abnormality detector 151 detects the presence or absence of an abnormality in the first load 40 or the second load 50 based on a voltage detected by the first voltage detector 141 and/or the second voltage detector 142. Further, in step S501, the abnormality detector 151 detects an abnormality by determining that the abnormality has occurred in the first load 40 or the second load 50 when a voltage detected by the first voltage detector 141 drops below a predetermined voltage. In step S501, if the abnormality detector 151 detects that an abnormality has occurred in the first load 40 or the second load 50 (step S501: YES), the processing proceeds to step S502. Meanwhile, in step S501, if the abnormality detector 151 does not detect that an abnormality has occurred in the first load 40 or the second load 50 (step S501: NO), the processing repeats the processing of step S501.

In step S502, the switch control unit 152 switches off the first switch 110. Thereafter, the processing proceeds to step S503.

In step S503, the switch control unit 152 switches on the second switch 120. Thereafter, the processing proceeds to step S504.

In step S504, the abnormality detector 151 determines whether an abnormal state due to a ground fault or the like that has occurred in the first load 40 or the second load 50 has been eliminated and the voltages of the first load 40 and the second load 50 have returned to normal. Specifically, the abnormality detector 151 detects that an abnormal state that has occurred in the first load 40 or the second load 50 has been eliminated when a voltage detected by the first voltage detector 141 or the second voltage detector 142 increases above a predetermined voltage. In step S504, if the abnormality detector 151 determines that the first load 40 and the second load 50 have returned to the normal states (step S504: YES), the processing proceeds to step S505. Meanwhile, in step S504, if the abnormality detector 151 determines that the first load 40 and the second load 50 have not returned to the normal states (step S504: NO), the processing repeats the processing of step S504. That is, the processing of step S504 is repeated until the first fuse 400 or the second fuse 500 corresponding to the first load 40 or the second load 50 in which the abnormality has occurred is fused.

In step S505, the switch control unit 152 switches off the second switch 120. Thereafter, the processing proceeds to step S506.

In step S506, the switch control unit 152 switches on the first switch 110. Thereafter, the processing ends.

As described above, the power source control system 1 includes the first power source 10, the second power source 20, the first fuse 400, the second fuse 500, the first voltage detector 141, the second voltage detector 142, the first switch 110, the second switch 120, and the control unit 150. The first power source 10 supplies power to the first load 40 and the plurality of second loads 50 provided in the vehicle via the first conductive path L1 connected to the first load 40 and the second conductive path L2 connected to the plurality of second loads 50. The second power source 20 supplies power to the second load 50 via the second conductive path L2 when an abnormality occurs in the first load 40 or the second load 50. The first fuse 400 is provided in the first conductive path L1, and is fused when an abnormality occurs in the first load 40. The second fuse 500 is provided in the second conductive path L2 and corresponds to each of the plurality of second loads 50, and is fused when an abnormality occurs in the second load 50. The first voltage detector 141 is connected to the first conductive path L1 and detects the voltages of the first load 40 and the plurality of second loads 50. The second voltage detector 142 is connected to the second conductive path L2 and detects the voltages of the plurality of second loads 50. The first switch 110 has one end connected to the first power source 10 and the other end connected to the second conductive path L2. The second switch 120 has one end connected to the second power source 20 and the other end connected to the second conductive path L2. The control unit 150 has the abnormality detector 151 that detects the presence or absence of an abnormality in the first load 40 or the second load 50 based on a voltage detected by the first voltage detector 141 and/or the second voltage detector 142. In addition, the control unit 150 has the switch control unit 152. The switch control unit 152 switches on the first switch 110 and switches off the second switch 120 in the normal state. In addition, when the abnormality detector 151 detects an abnormality in the first load 40 or the second load 50, the switch control unit 152 switches off the first switch 110 and switches on the second switch 120.

Thus, when an abnormality occurs in some loads among a plurality of loads mounted on the vehicle, the power source control system 1 can continuously supply power to the load in which the abnormality has not occurred. Further, when an abnormality has occurred, the power source control system 1 can switch a path for power supply, thereby reducing the influence on the first power source 10, which is the main power source.

The switch control unit 152 switches off the first switch 110 and switches on the second switch 120 when the abnormality detector 151 detects an abnormality in the first load 40 or the second load 50, and then switches on the first switch 110 and switches off the second switch 120. Specifically, the switch control unit 152 switches on the first switch 110 and switches off the second switch 120 when the abnormality detector 151 detects that an abnormal state that has occurred in the first load 40 or the second load 50 has been eliminated. Thus, the power source control system 1 makes it possible to enable the vehicle to travel to a place where safety is ensured by supplying the power from the first power source 10 or the second power source 20 to either the first load 40 or the second load 50 where the abnormality has not occurred during the period from the occurrence of the abnormality to the elimination of the abnormality. Further, even if an abnormality occurs partially in the second load 50 necessary for automatic driving of the vehicle, the power source control system 1 according to the present embodiment makes it possible to enable the vehicle to travel continuously using the second load 50 and/or the first load 40 in which the abnormality has not occurred.

Further, the abnormality detector 151 may detect an abnormality by determining that the abnormality has occurred in the first load 40 or the second load 50 when a voltage detected by the first voltage detector 141 drops below a predetermined voltage. Thus, the power source control system 1 can detect an abnormality such as a ground fault that has occurred in the first load 40 or the second load 50 without providing an abnormality detection device for each of the first load 40 and the second load 50. That is, the power source control system 1 does not need to provide an abnormality detection device for each of the loads which increases with the improvement of the function and performance of the vehicle, thereby making it possible to reduce the device in weight and power consumption.

Further, the abnormality detector 151 detects that an abnormal state that has occurred in the first load 40 or the second load 50 has been eliminated when a voltage detected by the first voltage detector 141 or the second voltage detector 142 increases above a predetermined voltage. In the present embodiment, a voltage detected by the first voltage detector 141 or the second voltage detector 142 increases above the predetermined voltage because the first fuse 400 or the second fuse 500 corresponding to the first load 40 or the second load 50 in which an abnormality has occurred is fused. Thus, in the elimination (recovery) of the abnormal state, the power source control system 1 can eliminate an abnormal state and detect that the abnormal state in the system has been eliminated without using a dedicated device or recovery means for recovery of abnormality.

Another Embodiment

Although the present embodiment has been described in detail with reference to the drawings, the present embodiment is not limited by the contents described in the above description. Moreover, the components described above include those that can be easily assumed by a person skilled in the art and those that are substantially identical. Furthermore, the configurations described above can be combined as appropriate. In addition, various omissions, substitutions or modifications of the configurations can be made to the extent that they do not deviate from the gist of the embodiment.

Figure 6:
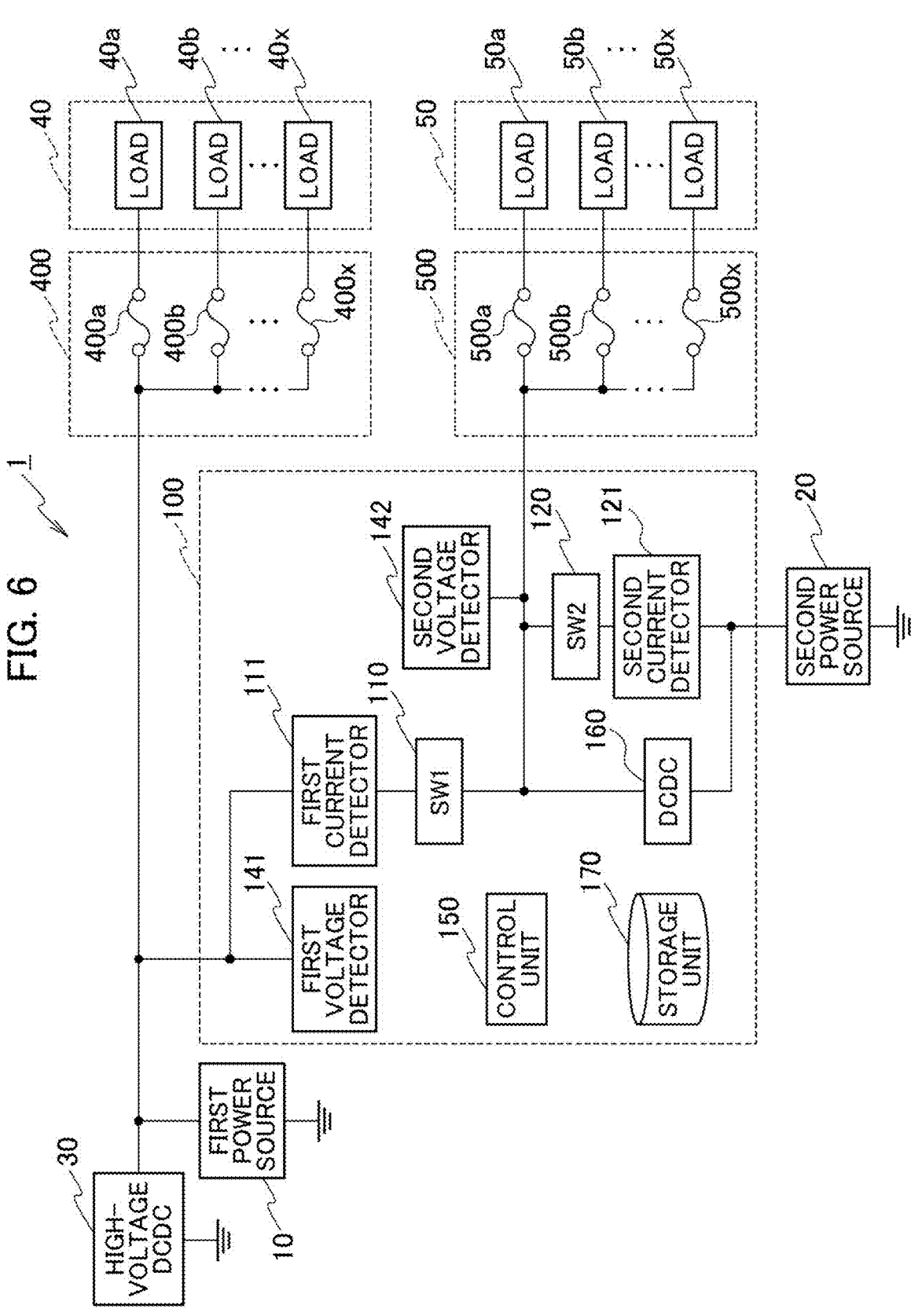
FIG. 6 is a block diagram illustrating a configuration of a power source control system according to another embodiment.

In the above-described embodiment, the first voltage detector 141 and the second voltage detector 142 detect a voltage that has dropped due to the occurrence of an abnormality such as a ground fault in the first load 40 or the second load 50, and also detect a voltage after the abnormal state has been eliminated. The configuration in the present embodiment is not limited to the configuration in which the occurrence of an abnormality and the elimination of an abnormality in the first load 40 or the second load 50 are detected by the first voltage detector 141 and the second voltage detector 142. For example, as illustrated in FIG. 6, the power source control system 1 may include a first current detector 111 connected in series with the first switch 110 and a second current detector 121 connected in series with the second switch 120. The first voltage detector 141 corresponds to a voltage detector. The second current detector 121 corresponds to a current detector.

For example, when an abnormality such as a ground fault occurs in the second load 50, an excessive current flows in the second conductive path L2. The first current detector 111 can detect an excessive current flowing in the second conductive path L2 due to the ground fault or the like occurred in the second load 50. In this case, the abnormality detector 151 can more accurately detect the abnormality in the second load 50 based on the voltage drop detected by the first voltage detector 141 and the excessive current detected by the first current detector 111.

For example, when an abnormality occurs in the second load 50 due to a ground fault or the like, and the voltage drop is small, the abnormality in the second load 50 can be detected more accurately by detecting the excessive current detected by the first current detector 111. Further, when the second fuse 500 is fused, the current flowing in the second current detector 121 returns to a normal value, and thus the abnormality detector 151 can more accurately detect that the abnormal state that has occurred in the second load 50 due to a ground fault or the like has been eliminated.

In the example illustrated in FIG. 6, the first current detector 111 is not an essential element, and the example illustrated in FIG. 6 may be configured with, for example, the first voltage detector 141 and the second current detector 121. In this case, the detection of the abnormality in the second load 50 is determined by the voltage drop detected by the first voltage detector 141. In addition, when the second fuse 500 corresponding to the second load 50 in which the abnormality has occurred is fused, the abnormality detector 151 can detect that the current flowing in the second current detector 121 returns to a normal value and the load in the second load 50 has been eliminated.

Figure 7:
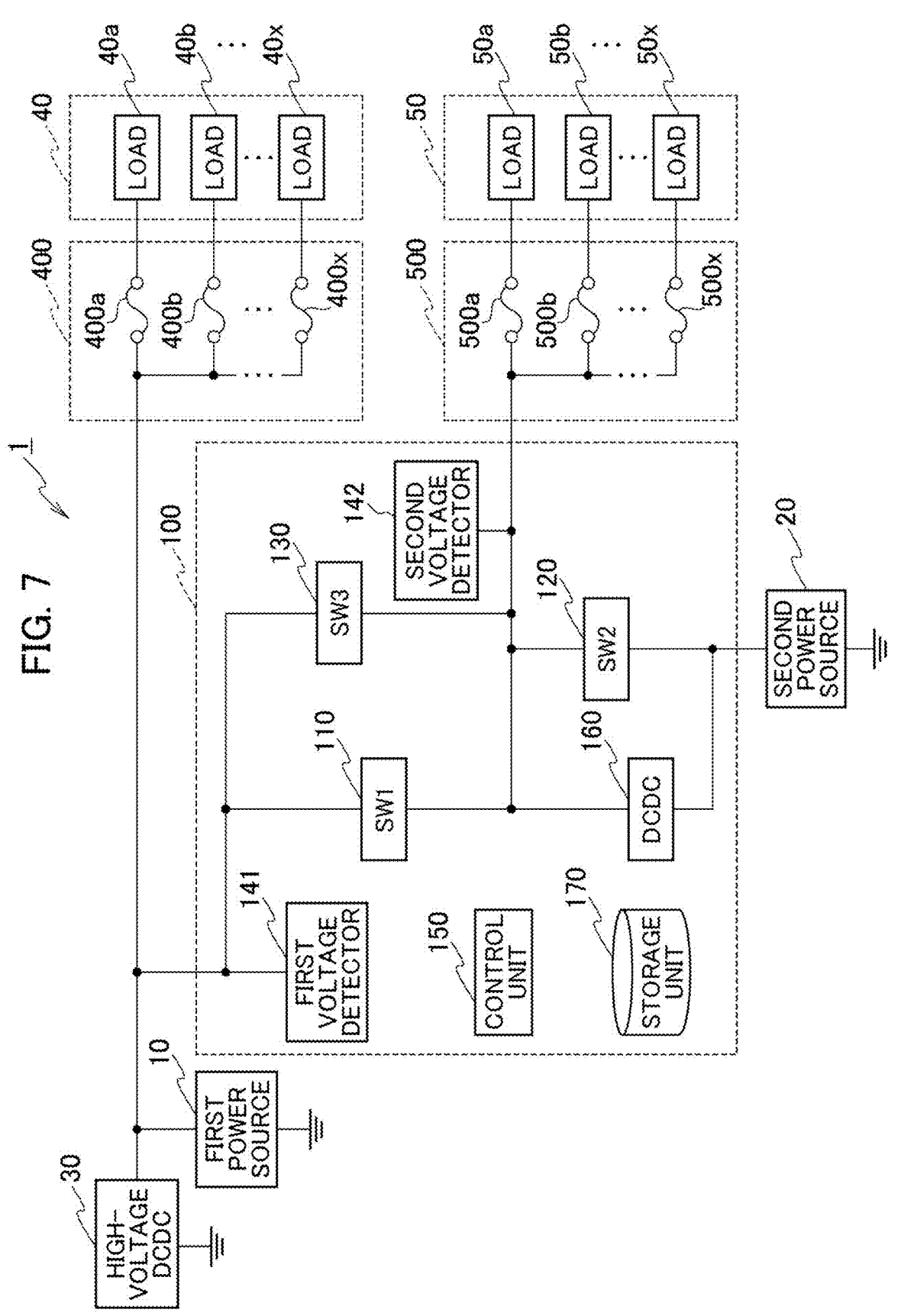
FIG. 7 is a block diagram illustrating the configuration of the power source control system according to another embodiment.

The power source control system 1 may also include a third switch 130 having one end connected to the first power source 10 and the other end connected to the second conductive path L2. FIG. 7 is a diagram illustrating a configuration including the third switch 130. For example, when an ignition switch of the vehicle is switched off, the first switch 110 and the second switch 120 are switched off and the third switch 130 is switched on. The third switch 130 is a path for supplying a dark current to the second load 50 when the ignition switch is OFF.

Figure 8:
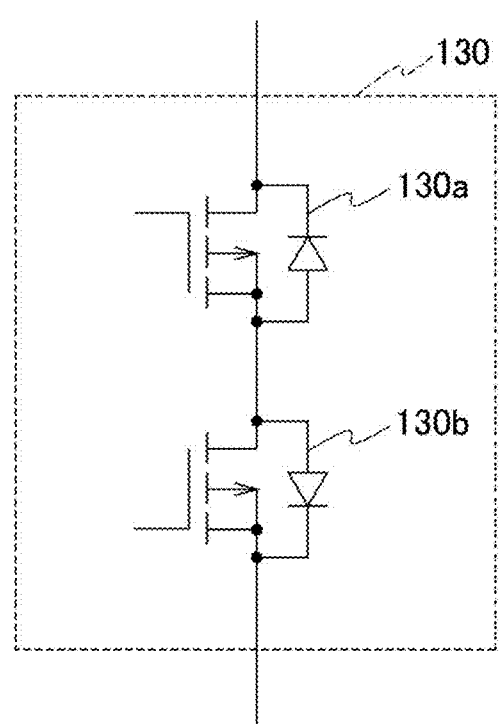
FIG. 8 is a block diagram illustrating a configuration of a switch according to another embodiment.

FIG. 8 is a diagram illustrating a circuit configuration of the third switch 130 illustrated in FIG. 7. The third switch 130 is constituted by two semiconductor switch elements, and specifically, has a third element 130a and a fourth element 130b. The third element 130a and the fourth element 130b are both constituted as P-channel MOSFETs, and are arranged in opposite directions to each other. In addition, the third switch 130 is controlled to be ON and OFF by the control unit 150 described later. Thus, the dark current can be reduced by realizing the third switch 130 with a P-channel MOSFET.

Figure 9:
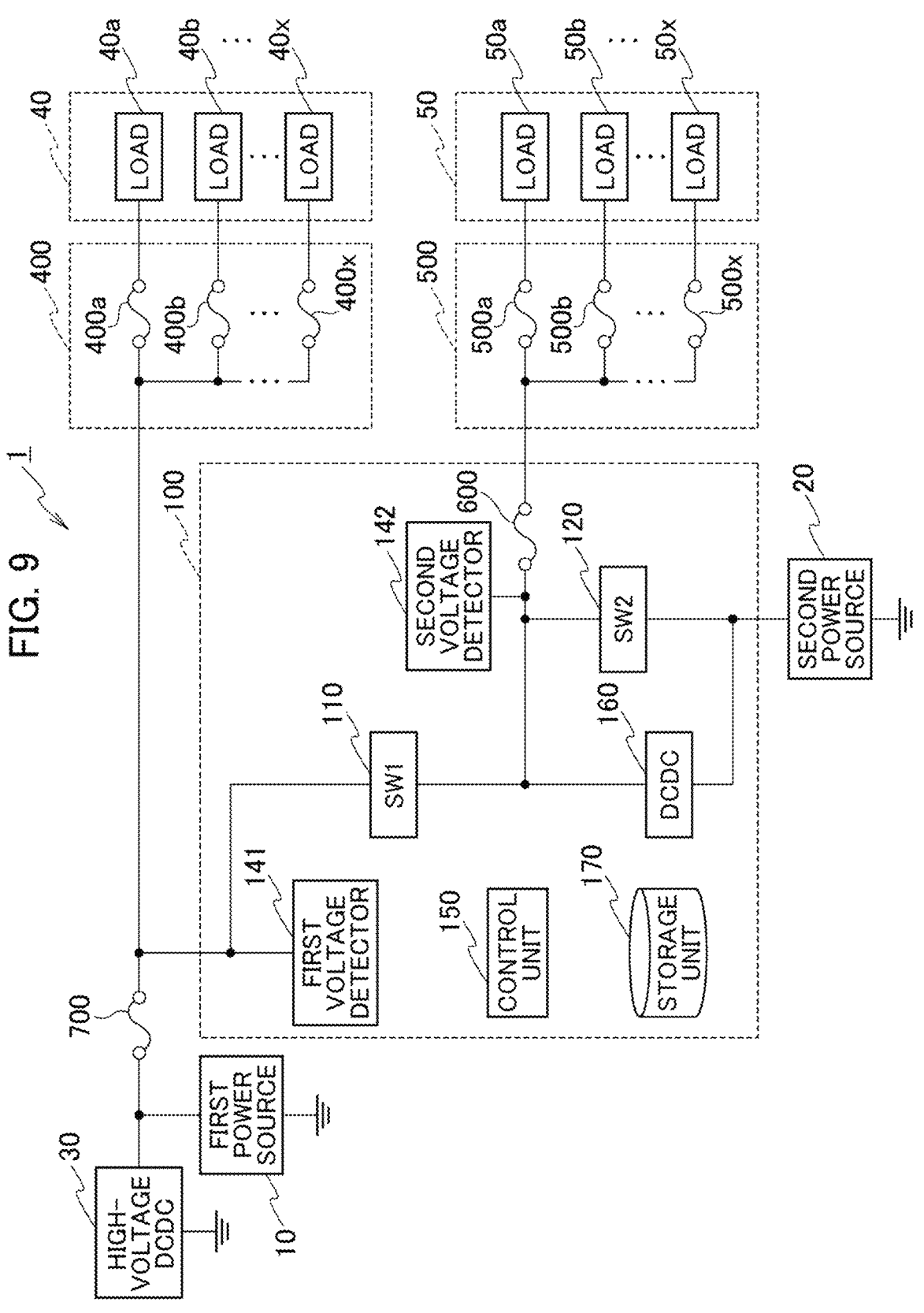
FIG. 9 is a block diagram illustrating the configuration of the power source control system according to another embodiment.

As illustrated in FIG. 9, the power source control system 1 may also include a fourth fuse 700 in the first conductive path L1 and/or a third fuse 600 in the second conductive path L2. The capacities of the third fuse 600 and the fourth fuse 700 are larger than those of the first fuse 400 and the second fuse 500. For example, there is a case where an abnormality occurs in the first load 40 or the second load 50 due to a ground fault or the like, and an excessive current exceeding an allowable range flows in the first conductive path L1 and the second conductive path L2. When an excessive current exceeding such an allowable range flows, it is necessary to protect the first power source 10, the second power source 20, the second switch 120, the first conductive path L1, and the second conductive path L2 from the excessive current. That is, by providing the fourth fuse 700 in the first conductive path L1 and/or the third fuse 600 in the second conductive path L2, it is possible to prevent the failure of the first power source 10, the second power source 20, the second switch 120, the first conductive path L1, and the second conductive path L2 due to the excessive current.

A computer program (power source control method) causing a computer to execute the processing (power source control program) in the power source control device 100 described above, and a computer-readable recording medium having the program recorded thereon are included in the scope of the present embodiment. The type of computer-readable recording medium is any type. The computer program is not limited to one recorded on the recording medium and may be one transmitted via a telecommunication line, a wireless or wired communication line, a network represented by the Internet, or the like.

The features of the power source control system 1 will be described below.

The power source control system 1 according to a first aspect includes the first power source 10 that supplies power to the first load 40 and the plurality of second loads 50 provided in a vehicle via the first conductive path L1 connected to the first load 40 and the second conductive path L2 connected to the plurality of second loads 50. In addition, the power source control system 1 includes the second power source 20 that supplies power to the second load 50 via the second conductive path L2 when an abnormality occurs in the first load 40 or the second load 50. In addition, the power source control system 1 includes the first fuse 400 that is provided in the first conductive path L1 and fused when an abnormality occurs in the first load 40. In addition, the power source control system 1 includes a plurality of second fuses 500, which are provided in the second conductive path L2, corresponding to each of the plurality of second loads 50 and fused when an abnormality occurs in the second load 50. In addition, the power source control system 1 includes the first voltage detector 141 that is connected to the first conductive path L1 and detects voltages of the first load 40 and the plurality of second loads 50. In addition, the power source control system 1 includes the second voltage detector 142 that is connected to the second conductive path L2 and detects voltages of the plurality of second loads 50. In addition, the power source control system 1 includes the first switch 110 having one end connected to the first power source 10 and the other end connected to the second conductive path L2. In addition, the power source control system 1 includes the second switch 120 having one end connected to the second power source 20 and the other end connected to the second conductive path L2. Further, the power source control system 1 includes the control unit 150. The control unit 150 has the abnormality detector 151 that detects the presence or absence of an abnormality in the first load 40 or the second load 50 based on a voltage detected by the first voltage detector 141 and/or the second voltage detector 142. The control unit 150 has the switch control unit 152 that switches on the first switch 110 and switches off the second switch 120 in a normal state. When the abnormality detector 151 detects an abnormality in the first load 40 or the second load 50, the switch control unit 152 switches off the first switch 110 and switches on the second switch 120.

According to the configuration described above, when an abnormality occurs in some loads among a plurality of loads mounted on the vehicle, the power source control system 1 can continuously supply power to the load in which the abnormality has not occurred. Further, when an abnormality has occurred, the power source control system 1 can switch a path for power supply, thereby reducing the influence on the first power source 10, which is the main power source.

The switch control unit 152 of the power source control system 1 according to a second aspect may switch off the first switch 110 and switch on the second switch 120 when the abnormality detector 151 detects an abnormality in the first load 40 or the second load 50. Further, when the abnormality detector 151 subsequently detects that an abnormal state that has occurred in the first load 40 or the second load 50 has been eliminated, the switch control unit 152 may switch on the first switch 110 and switch off the second switch 120.

According to the configuration described above, the power source control system 1 makes it possible to enable the vehicle to travel to a place where safety is ensured by supplying the power from the first power source 10 or the second power source 20 to either the first load 40 or the second load 50 where an abnormality has not occurred during the period from the occurrence of the abnormality to the elimination of the abnormality. Further, even if an abnormality occurs partially in the second load 50 necessary for automatic driving of the vehicle, the power source control system 1 according to the present embodiment makes it possible to enable the vehicle to travel continuously using the second load 50 and/or the first load 40 in which the abnormality has not occurred.

The abnormality detector 151 of the power source control system 1 according to a third aspect may detect an abnormality by determining that the abnormality has occurred in the first load 40 or the second load 50 when a voltage detected by the first voltage detector 141 drops below a predetermined voltage.

According to the configuration described above, the power source control system 1 can detect an abnormality such as a ground fault that has occurred in the first load 40 or the second load 50 without providing an abnormality detection device for each of the first load 40 and the second load 50. That is, the power source control system 1 does not need to provide an abnormality detection device for each of the loads which increases with the improvement of the function and performance of the vehicle, thereby making it possible to reduce the device in weight and power consumption.

The abnormality detector 151 of the power source control system 1 according to a fourth aspect may detect that an abnormal state that has occurred in the first load 40 or the second load 50 has been eliminated when a voltage detected by the first voltage detector 141 or the second voltage detector 142 increases above the predetermined voltage. Further, the voltage detected by the first voltage detector 141 or the second voltage detector 142 may increase because the first fuse 400 or the second fuse 500 corresponding to the first load 40 or the second load 50 in which an abnormality has occurred is fused.

According to the configuration described above, in the elimination (recovery) of the abnormal state, the power source control system 1 can eliminate an abnormal state and detect that the abnormal state in the system has been eliminated without using a dedicated device or recovery means for recovery of abnormality.

The power source control system 1 according to a fifth aspect includes the first power source 10 that supplies power to the first load 40 and the plurality of second loads 50 provided in a vehicle via the first conductive path L1 connected to the first load 40 and the second conductive path L2 connected to the plurality of second loads 50. In addition, the power source control system 1 includes the second power source 20 that supplies power to the second load 50 via the second conductive path L2 when an abnormality occurs in the first load 40 or the second load 50. In addition, the power source control system 1 includes the first fuse 400 that is provided in the first conductive path L1 and fused when an abnormality occurs in the first load 40. In addition, the power source control system 1 includes a plurality of second fuses 500, which are provided in the second conductive path L2, corresponding to each of the plurality of second loads 50 and fused when an abnormality occurs in the second load 50. In addition, the power source control system 1 includes a voltage detector that is connected to the first conductive path L1 and detects voltages of the first load 40 and the plurality of second loads 50. In addition, the power source control system 1 includes the first switch 110 having one end connected to the first power source 10 and having one end connected to the first power source 10 and the other end connected to the second conductive path L2. In addition, the power source control system 1 includes the second switch 120 having one end connected to the second power source 20 and the other end connected to the second conductive path L2. In addition, the power source control system 1 includes a current detector connected in series with the second switch 120. Further, the power source control system 1 includes the control unit 150. The control unit 150 has the abnormality detector 151 that detects the presence or absence of an abnormality in the first load 40 or the second load 50 based on a voltage detected by the voltage detector and/or a current detected by the current detector. Further, the control unit 150 has the switch control unit 152 that switches on the first switch 110 and switches off the second switch 120 in a normal state. When the abnormality detector 151 detects an abnormality in the first load 40 or the second load 50, the switch control unit 152 switches off the first switch 110 and switches on the second switch 120.

According to the configuration described above, when an abnormality occurs in some loads among a plurality of loads mounted on the vehicle, the power source control system 1 can continuously supply power to the load in which the abnormality has not occurred. In addition, when an abnormality has occurred, the power source control system 1 can switch a path for power supply, thereby reducing the influence on the first power source 10, which is the main power source. In addition, the abnormality detector 151 of the power source control system 1 can more accurately detect the abnormality in the second load 50 based on the voltage drop detected by the voltage detector (first voltage detector 141) and the excessive current detected by the current detector (first current detector 111). Further, the abnormality detector 151 of the power source control system 1 can more accurately detect that the abnormal state that has occurred in the second load 50 due to a ground fault or the like has been eliminated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A power source control system comprising:
a first power source that supplies power to a first load and a plurality of second loads provided in a vehicle via a first conductive path connected to the first load and a second conductive path connected to the plurality of second loads;
a second power source that supplies power to the plurality of second loads via the second conductive path when an abnormality occurs in the first load and supplies power to the plurality of second loads via the second conductive path when the abnormality occurs in the plurality of second loads;
a first fuse that is provided in the first conductive path and fused when an abnormality occurs in the first load;
a plurality of second fuses, which are provided in the second conductive path, corresponding to each of the plurality of second loads and fused when an abnormality occurs in the plurality of second loads;

a first voltage detector that is connected to the first conductive path and detects voltages of the first load and the plurality of second loads;
a second voltage detector that is connected to the second conductive path and detects voltages of the plurality of second loads;
a first switch having one end connected to the first power source and the other end connected to the second conductive path;
a second switch having one end connected to the second power source and the other end connected to the second conductive path; and
a control unit,
wherein the control unit includes:
an abnormality detector that detects the presence or absence of an abnormality in the first load or the plurality of second loads based on at least one of the voltages detected by the first voltage detector or the voltages the second voltage detector; and
a switch control unit that switches on the first switch and switches off the second switch in a normal state, and switches off the first switch and switches on the second switch when the abnormality detector detects an abnormality in the first load or the plurality of second loads.

2. The power source control system according to claim 1, wherein the switch control unit switches off the first switch and switches on the second switch when the abnormality detector detects an abnormality in the first load or the plurality of second loads, and when the abnormality detector subsequently detects that an abnormal state that has occurred in the first load or the plurality of second loads has been eliminated, the switch control unit switches on the first switch and switch off the second switch.

3. The power source control system according to claim 2, wherein the abnormality detector detects an abnormality by determining that the abnormality has occurred in the first load or the plurality of second loads when the voltages detected by the first voltage detector drops below a predetermined voltage.

4. The power source control system according to claim 3, wherein the first fuse or the second fuse corresponding to the first load or the plurality of second loads in which an abnormality has occurred is fused, and when a voltage detected by the first voltage detector or the second voltage detector increases above the predetermined voltage, the abnormality detector detects that an abnormal state that has occurred in the first load or the plurality of second loads has been eliminated.

5. A power source control system comprising:
a first power source that supplies power to a first load and a plurality of second loads provided in a vehicle via a first conductive path connected to the first load and a second conductive path connected to the plurality of second loads;
a second power source that supplies power to the plurality of second loads via the second conductive path when an abnormality occurs in the first load and supplies power to the second load via the second conductive path when an abnormality occurs in the plurality of second loads;
a first fuse that is provided in the first conductive path and fused when an abnormality occurs in the first load;
a plurality of second fuses, which are provided in the second conductive path, corresponding to each of the plurality of second loads and fused when an abnormality occurs in the plurality of second loads;

a voltage detector that is connected to the first conductive path and detects voltages of the first load and the plurality of second loads;

a first switch having one end connected to the first power source and the other end connected to the second conductive path;

a second switch having one end connected to the second power source and the other end connected to the second conductive path;

a current detector connected in series with the second switch; and a control unit, wherein the control unit includes:

an abnormality detector that detects the presence or absence of an abnormality in the first load or the plurality of second loads based on a voltage detected by the voltage detector and/or a current detected by the current detector; and a switch control unit that switches on the first switch and switches off the second switch in a normal state, and switches off the first switch and switches on the second switch when the abnormality detector detects an abnormality in the first load or the plurality of second loads.

* * * * *